United States Patent [19]

Pelloni et al.

[11] Patent Number: 4,733,040

[45] Date of Patent: Mar. 22, 1988

[54] METHOD FOR THE CONTROLLED WITHDRAWAL MOVEMENT OF AN ELECTRODE IN AN ELECTROEROSION MACHINE

[75] Inventors: Norman Pelloni, Gordola; Antonio Prati, Locarno, both of Switzerland

[73] Assignee: AG fur Industrielle Elektronik AGIE Losone bei Locarno, Losone, Switzerland

[21] Appl. No.: 885,949

[22] Filed: Jul. 15, 1986

[30] Foreign Application Priority Data

Jul. 18, 1985 [DE] Fed. Rep. of Germany ....... 3525683

[51] Int. Cl.$^4$ .............................................. B23H 7/26
[52] U.S. Cl. ............................. 219/69 M; 204/129.25; 204/129.5; 219/69 G; 219/69 S; 219/69 V
[58] Field of Search ............... 219/69 V, 69 G, 69 M, 219/69 S; 204/129.25, 129.5

[56] References Cited

U.S. PATENT DOCUMENTS

| | | | |
|---|---|---|---|
| 4,135,070 | 1/1979 | Pfau et al. | 219/69 G |
| 4,361,745 | 11/1982 | Rupert et al. | 219/69 G |
| 4,564,912 | 1/1986 | Schwefel | 219/69 G |
| 4,608,476 | 8/1986 | Shimizu | 219/69 V |

FOREIGN PATENT DOCUMENTS

| | | |
|---|---|---|
| 1690752 | 9/1969 | Fed. Rep. of Germany. |
| 3135934 | 5/1982 | Fed. Rep. of Germany. |
| 3208389 | 11/1983 | Fed. Rep. of Germany. |

OTHER PUBLICATIONS

"ISOCUT", Charmilles Erowa, Feb. 1978.

*Primary Examiner*—A. D. Pellinen
*Assistant Examiner*—Geoffrey S. Evans
*Attorney, Agent, or Firm*—Helfgott & Karas

[57] ABSTRACT

To eliminate short-circuits between a countersink electrode and a workpiece during countersink erosion, when a short-circuit occurs, the countersink electrode is initially moved back by a predetermined path length ($\delta$) along the previously travelled path from a first locus ($P_K$) at which the short-circuit occurred to a second locus or intermediate point ($P_R$) and it is established at that location whether there is still a short-circuit. If this is the case, the countersink electrode is moved in an upwardly sloping manner along a second path (R), which has a first angle ($\alpha$) with respect to the working plane (AE) and has a movement component ($R_1$) having a second angle ($\beta$) with respect to a surface normal to the short-circuit or intermediate point ($P_K$ or $P_R$). All the parameters ($\alpha, \beta, \delta, |R|$) can be freely preselected and are variable during erosion.

11 Claims, 8 Drawing Figures

METHOD FOR THE CONTROLLED WITHDRAWAL MOVEMENT OF AN ELECTRODE IN AN ELECTROEROSION MACHINE

BACKGROUND OF THE INVENTION

The present invention relates generally to electroerosion machining and more particularly to a method for the controlled withdrawal of a countersink or counterbore electrode in an electroerosion or spark erosion machine in the event of a short-circuit between the electrode and the workpiece.

Generally a working clearance must be provided between the electrode and the workpiece during electroerosion or spark erosion machining in order to prevent short-circuits from forming. However, if a short-circuit does occur, it must be eliminated by the relative displacement of the electrode with respect to the workpiece. That is the original clearance must be restored.

In an AGIEMAT III type electroerosion machine that is well-known is the prior art, when a short-circuit occurs the electrode is withdrawn by moving it in such a way that the electrode initially moves in the direction towards the center of the eroded opening in the working or XY-plane and is then withdrawn vertically from the center point and therefore from the opening in the Z-direction. The electrode must then again be inserted into the opening that is to be further eroded. The aforementioned operating procedure that is utilized in the prior art methods is time-consuming and suffers from the further disadvantage that, in some cases, the short-circuit cannot be eliminated sufficiently rapidly, whereas in other cases the short-circuit removal measure is dimensionally excessive, that is, in some cases the withdrawal section is longer than necessary to remove the short-circuit. Finally, this type of withdrawal movement cab be used in those instances where the shape of the eroded opening is complex because in some cases during the withdrawal procedure there can be physical contact or interference between the electrode and the wall of the eroded opening of the workpiece.

SUMMARY OF THE INVENTION

The problem addressed by the present invention is therefore to improve the method of removing and reinserting the electrode in such a way that unnecessarily long withdrawal movements are avoided and short-circuits are eliminated as rapidly as possible. In addition, the path configuration of the withdrawal movement must be as flexibly adaptable as possible to the geometry of the eroded opening.

If a short-circuit occurs, the countersink electrode of the present invention is initially moved back along the same path it had just travelled path and for a randomly predetermined distance. In many cases this form of electrode travel in itself eliminates the short-circuit, so that the forward movement of the electrode can be initiated again. At the end of this first withdrawal path, a check is made to establish whether the short-circuit is eliminated. If this is not the case, the electrode is advanced on a second predetermined path further from the short-circuit point. This second path is linear and is consequently called the withdrawal vector. Generally the withdrawal vector is oriented in such a way that the electrode moves as rapidly as possible in a direction away from the short-circuit point. To the extent that this is permitted by the geometry of the eroded workpiece opening, the electrode is moved out in an upwardly sloping manner.

For an optimum flexible adaptation of the withdrawal path to the geometry of the eroded opening, the withdrawal vector is either determined continuously, or when a short-circuit occurs. The withdrawal vector can be defined in different ways. It can firstly be defined in expressions of the main axes of the machine (X,Y,Z), i.e. in a machine-oriented coordinate system. As the direction of movement of the electrode during countersink erosion become more complex, it would then only be very difficult to determine the withdrawal vector position but the direction of movement could hardly be modified by the machine operator during erosion. Thus, preference is given to the definition of the withdrawal vector in a user-oriented coordinate system, whose parameters can be more easily controlled. The withdrawal vector is preferably defined in the manner described hereinafter.

A tangential plane is determined at the intermediate point (withdrawal point), which therefore contains all the tangents at the intermediate point. In addition, a normal plane at the intermediate point is determined and this is a right angles to the tangential plane and to the working plane. In turn, the working plane contains the tangent in the intermediate point, which is simultaneously the tangent in the erosion path. These three planes (working plane, tangential plane and normal plane) are consequently at right angles to one another and form a coordinate system independent of the main machine axes. However, in some cases the working plane can coincide with the X-Y plane of the machine. If the erosion path coincides with one of the main axes, of the machine, either X or Y-axis, then in these exceptional cases the tangential and normal planes enclose the main axes of the machine.

The plane in which the withdrawal vector is located is then tilted with respect to the three planes of the independent coordinate system. The withdrawal plane is preferably at right angles to the tangential plane, so that it is tilted by an angle ($\beta$) with respect to the normal plane. This angle ($\beta$) is very clear and descriptive for the operator, because it gives the angle of inclination of the withdrawal vector with respect to the main erosion direction. In addition, the withdrawal vector is tilted by an angle (90°-$\alpha$) with respect to the tangential plane, which is also very clear to the operator, because the angle (90°-$\alpha$) designates the inclination of the withdrawal vector with respect to the wall of the eroded recess.

Both angles $\beta$ and (90°-$\alpha$) are freely preselectable and can also be modified during the erosion process. This also applies to the length of the withdrawal vector, so that the latter can be flexibly adapted to the particular requirements.

The method according to the invention provides several advantages. All of the parameters of the complete "withdrawal path" can be freely preselected. In many cases the movement along the first path is sufficient to avoid short-circuits, so that no long work interruptions occur. The movement of the electrode along the second path rapidly eliminates possible short-circuits, because the electrode is very rapidly moved away from the short-circuit surface. Possible contact between the electrode and the workpiece during the withdrawal movement can be avoided by the freely preselectable parameters of the withdrawal movement.

As a function of the contour of the workpiece recess or opening to be eroded, the individual parameters of the withdrawal path can also be modified during the erosion process, so that contact between the electrode and the workpiece are always avoided.

BRIEF DESCRIPTION OF THE DRAWING

The invention is described in greater detail hereinafter with reference to the attached drawings, wherein like reference characters designate like parts.

In the Drawing

DETAILED DESCRIPTION OF THE PREFERRED EMBODIMENTS

Figure 1:
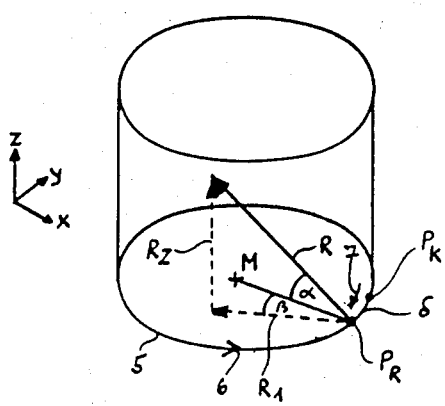
FIG. 1 is a perspective, elevational view schematically illustrating the withdrawal path of the countersink electrode according to the method comprising the present invention.

For purposes of illustration in all of the Figures of the drawing, the position of a Cartesian reference coordinate system (X,Y,Z) is illustrated in order to indicate the position of the main axes of the machine.

Figure 2:
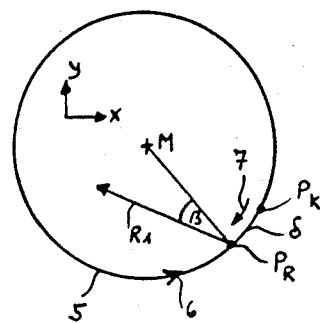
FIG. 2 is a schematic or diagrammatic plan view of the working or XY plane illustrating a component of the withdrawal path in the method according to the present invention.
Figure 3:
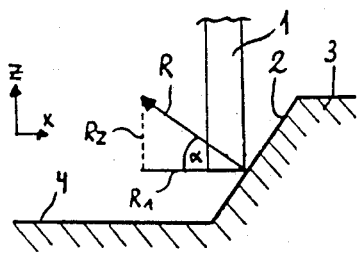
FIG. 3 is a diagrammatic, sectional side elevational view schematically illustrating a countersink electrode in the process of eroding a workpiece and utilizing the method of this invention.

In FIG. 3 a countersink electrode 1 is represented as a cylindrical body, which has already eroded a conical opening 2 in a workpiece 3 in accordance with the method of this invention. During erosion, the countersink electrode 1 is generally rotated about its longitudinal axis. In FIGS. 1, 2, 4 and 5 the eroded opening that is formed is substantially cylindrical, whereas it is conical in FIG. 3. The bottom 4 of the conical opening 2 is assumed to be planar, with the plane being designated as the working plane. In FIG. 3 of the drawing the plane of the bottom 4 coincides with the XY-plane. The relative movement between countersink electrode 1 and workpiece 3 is brought about by means of well-known, controllable displacement means such as by the movement of the workpiece 3 by XY-sliding carriages (not illustrated) and/or the movement of the electrode 1 by UV-sliding carriages (not illustrated). During normal erosion, this relative movement is performed in a known manner along preprogrammed paths.

With reference to FIGS. 1 and 2 it is assumed that the countersink electrode 1 is moved along a circular path 5 in the direction of the arrow 6 and that at the locus $P_K$ (hereinafter called "short-circuit point"), a short-circuit has occurred. This event can readily be established by well-known measuring/monitoring means (not illustrated).

According to a feature of the invention, after a short-circuit has been detected, the electrode 1 is moved back along the last path that was traversed during erosion process in the direction of the arrow 7 by a distance $\delta$ (first path) up to the locus $P_R$ (hereinafter called "intermediate point" or "withdrawal point"). The length of the distance $\delta$ is preprogrammed. A check is now made at the intermediate point $P_R$ to establish whether the short-circuit has been eliminated. If this is the case, there is a continuation of the erosion advance along the path 5 in the direction of the arrow 6.

However, if there is still a short-circuit at the intermediate point $P_R$, the countersink electrode 1 is moved along a second predetermined path (hereinafter called the "withdrawal vector"). This withdrawal vector R runs in a linearly upwardly sloping manner. Thus, the withdrawal vector R has a first angle $\alpha$ with respect to the working or XY-plane and this is between the withdrawal vector R and the connecting line between intermediate point $P_R$ and center M. In the case of an eroded opening 2 having a circular cross-section, the connecting line $P_{R-M}$ is the normal vector in the intermediate point. The center M is located in the XY-plane and is the center of the circle thereof in the case of an eroded opening 2 having a circular plan view. If the shape of the eroded opening 2 diverges from the circular shape, then in order to define the two angles $\alpha$ and $\beta$ use is made of the surface normal in either the short-circuit point $P_R$ or, preferably, in the intermediate point $P_R$. If the first path of length $\delta$ is very short, then these two points $P_R$ and $P_K$ are, in any case, very close together, so that the surface normal in the short-circuit point is taken as the reference quantity without significant errors occurring. However, if the path length $\delta$ is longer, then the surface normal in the intermediate point $P_R$ will be taken as the reference vector and this is illustrated in greater detail in conjunction with FIG. 4.

Thus, the "parameters" of the withdrawal movement are the path length $\delta$ along the first path the angles $\alpha$ and $\beta$ and the length of the second path R, i.e. the absolute quantity $|R|$ of the "withdrawal vector" R.

All these parameters can be freely preselected. They can also be modified during the erosion process if this becomes necessary by the configuration of the eroded opening 2, to avoid contact between the countersink electrode 1 and the workpiece 3 during withdrawal. The parameters can also be selected in such a way that the electrode 1 moves at right angles to the surface of the workpiece 3 at the withdrawal point $P_R$. Thus, in critical cases parameter $\beta$ can become zero. It must also be kept in mind when fixing the withdrawal path of the second path R that the electrode 1 does not come so near to other surface points of the workpiece 3 that there is contact or a short-circuit there.

The "withdrawal path" shown in the drawings are made large for illustration purposes and can be much smaller in practice.

Figure 4:
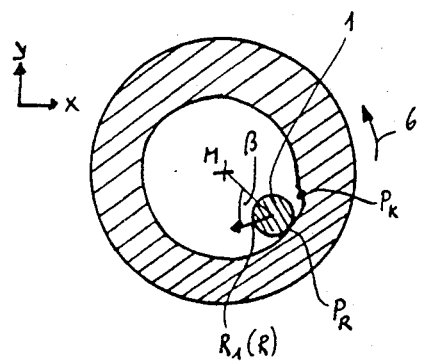
FIG. 4 is a sectional plan view illustrating a countersink electrode and a workpiece during countersink erosion of a cylindrical opening including the diagrammatic or schematic representation of the withdrawal path.

FIGS. 1 to 3 show a somewhat idealized representation of the process comprising this invention. A more realistic representation is given in FIGS. 4 and 5. During countersink erosion the electrode 1 has, by no means, a negligible diameter. Thus, part of its diameter cuts into the "meat" of the workpiece. The working clearance consequently extends in the plan view of FIG. 4 for a certain distance around the circumference of the electrode 1. It is therefore more correct to speak of a short-circuit surface than of a short-circuit point. If the imaginary short-circuit point $P_K$ is located in the center of the electrode 1, then the surface normal to the short-circuit point $P_K$, even in the case of an eroded opening with a circular contour, is not directed towards the center M, but in a direction having a component opposite to the main feed movement during erosion as shown by the arrow 6, in FIG. 4, which makes clear the function of the angle $\beta$. Depending on whether angle $\beta$ relates to the surface normal to the short-circuit point $P_K$ or an intermediate point $P_R$ as shown in FIG. 4, the size of the angle changes. The angle $\beta$, apart from extreme exceptional cases, will always be an acute angle. With its sign being fixed in such a way that the vector component $R_1$ of the withdrawal vector R in the XY-plane is always opposite to the feed direction designated by the arrow 6. This is the meaning of the term "withdrawal vector".

Figure 5:
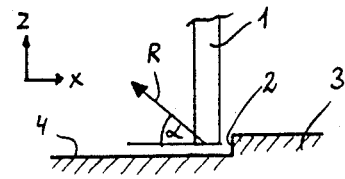
FIG. 5 is a sectional side elevational view of a countersink electrode and a workpiece diagrammatically representing the withdrawal path of the electrode where there is only a limited depth of the eroded opening.

FIG. 5 provides an explanation of the angle $\alpha$. The lower end of the electrode 1 is primarily intended to remove material from the bottom 4 of the opening to be eroded. Here again the electrode 1 must cut into the "meat" of the workpiece 3, so that a step is formed which is shown on an enlarged scale in FIG. 5. It is not possible to establish whether the actual short-circuit point occurs as a first possibility by contact between the end face of the electrode 1 and the bottom 4 of the opening 2 or, as a second possibility, by contact between the circumferential side surface of the electrode 1 and the step in the opening 2. With the first possible arrangement the electrode 1 would ideally be withdrawn vertically upwards in the Z-direction, whereas with the second arrangement the electrode 1 would have to be removed in a direction that is opposite to the X-axis and consequently horizontally away from the step 2. Thus, the electrode 1 is moved upwardly out of the opening 2 following a path below the angle $\alpha$, so that the electrode 1 is simultaneously moved away from the bottom surface 4 and the step 2. In the embodiment according to FIG. 5, the angle $\alpha$ is approximately 45°. Depending on the shape of the electrode 1, the opening 2 to be eroded and also some empirical values, the angle $\alpha$ can also assume other values. It is possible to establish statistically at what magnitude of angle $\alpha$ the short-circuit is most rapidly removed. The same applied to angle $\beta$. Therefore attempts will be made to keep the length of the withdrawal vector R as short as possible and consequently also the time lost during the movement away and then back again of the electrode 1 because this constitutes an interruption to the erosion process.

Figure 6:
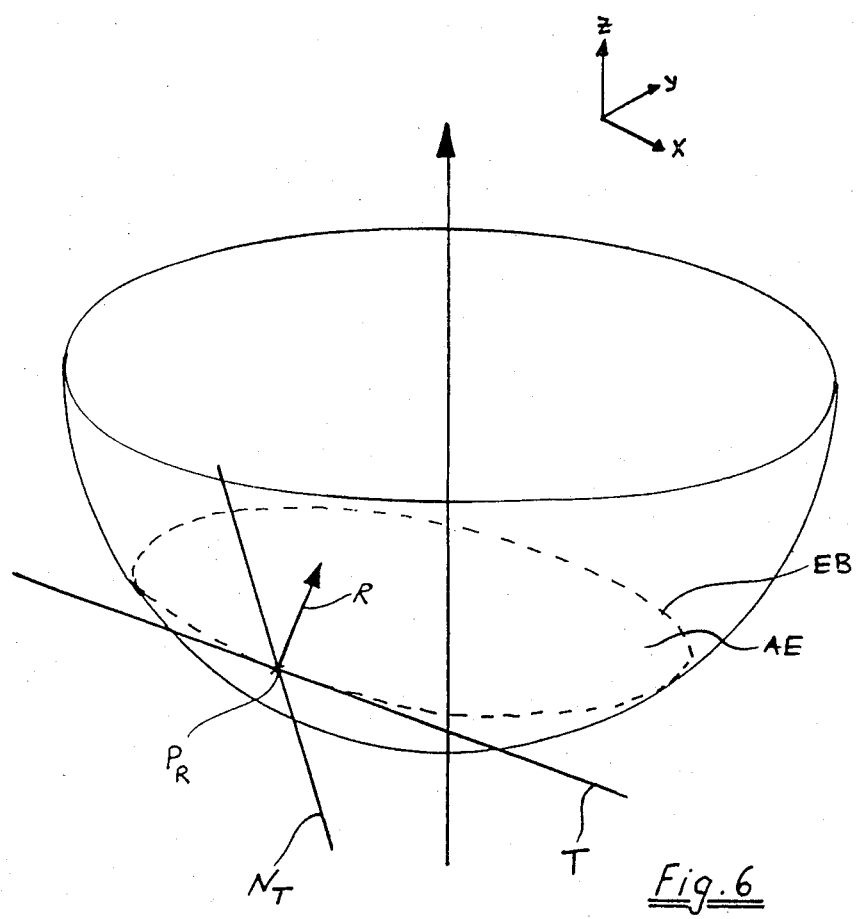
FIG. 6 is a perspective view schematically representing the withdrawal path of the electrode when eroding a spherical recess in accordance with the process of the invention.
Figure 7:
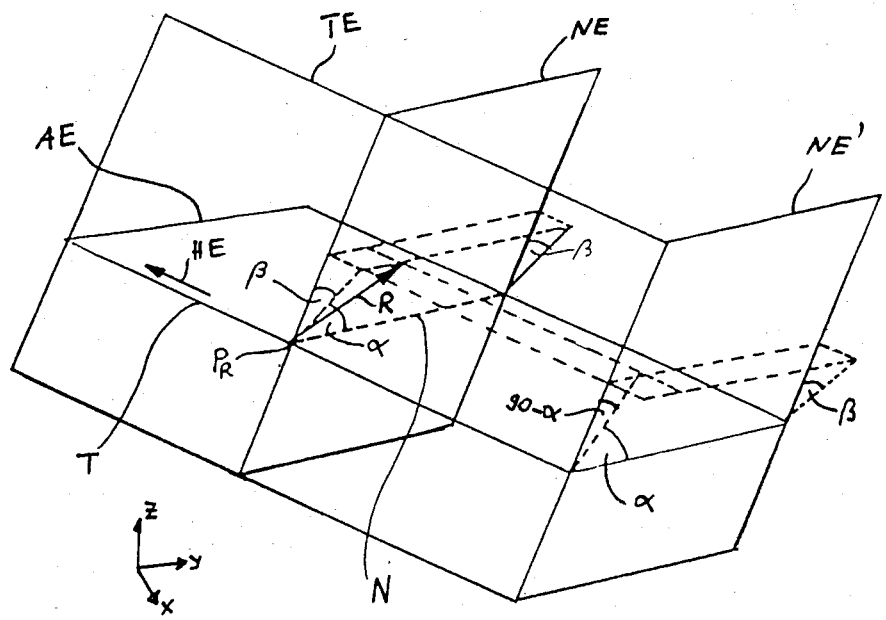
FIG. 7 is a diagrammatic perspective view schematically representing the withdrawal vector and withdrawal plane of the process of this invention.
Figure 8:
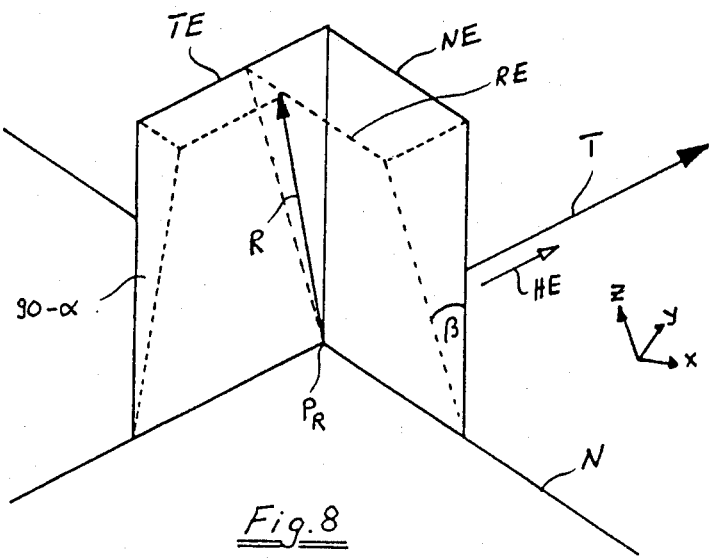
FIG. 8 is a view similar to FIG. 7, but from a different viewing angle.

FIGS. 6 to 8 illustrate a more general case in which the working plane AE does not coincide with the main axes of the machine (XY-plane). FIG. 6 diagrammatically illustrates the erosion of a spherical recess, where the erosion path EB, which supports the working plane AE, is tilted with respect to the XY-plane. To determine the withdrawal vector R at the withdrawal point $P_R$, a tangent T is applied to the withdrawal point $P_R$ and this is simultaneously the tangent of the erosion path EB at the point $P_R$. A further tangent $N_T$ is applied to the withdrawal point $P_R$ at right angles to the tangent T. Thus, both tangents T and $N_T$ define a tangential plane TE at the withdrawal point $P_R$, which is shown in FIGS. 7 and 8.

There is now a clearly defined plane at right angles to tangential plane $T_E$. The plane contains the tangent T and is at right angles to the tangent $N_T$. This plane is the working plane AE. A third plane, which is at right angles to the tangential plane TE and to the working plane AE, and consequently contains the tangent $N_T$ is called the normal plane NE. These three planes AE, TE and NE form a user-oriented coordinate system independent of the main machine axes. The withdrawal vector R can now be defined in a particularly clear way for the user by its length and two angles $\alpha$ and $\beta$.

As can be seen in FIGS. 7 and 8, the withdrawal vector R is tilted by an angle 90°-$\alpha$ with respect to the tangential plane TE. This angle indicates the inclination of the withdrawal vector R away from the wall of the eroded opening at the withdrawal point $P_R$. The withdrawal vector R is also tilted by the angle $\beta$ with respect to the normal plane NE, the angle $\beta$ defining the inclination of the withdrawal vector with respect to the main erosion direction HE. The angle $\beta$ is chosen in such a way that the withdrawal movement has a component opposite to the main erosion direction HE.

On the basis of these definitions, it is then possible to define a withdrawal plane RE (FIG. 8), which is tilted by the angle $\beta$ with respect to the normal plane NE. The withdrawal vector R is then located in this withdrawal plane RE and at an angle 90°-$\alpha$ with respect to tangential plane TE. The last-mentioned angle 90°-$\alpha$ was established in accordance with the embodiments of FIGS. 1 to 5, whereby in FIGS. 1, 3 and 5 the angle is measured from the working plane. For the purposes of a somewhat clearer representation, FIG. 7 also shows a plane NE' that is parallel to the normal lane NE and which more clearly shows the angles $\alpha$, 90°-$\alpha$ and $\beta$.

What is claimed is:

1. For use with an electroerosion machine, a method for the controlled withdrawal movement of a countersink electrode that has eroded an opening in a workpiece and in doing so has travelled along a given path and wherein there is a short circuit between the countersink electrode and the workpiece at a short-circuit point ($P_K$) on said path, said method comprising the steps of initially moving the countersink electrode back along said path for a length ($\delta$) from the short-circuit point ($P_K$) to an intermediate point ($P_R$) to establish where there is still a short-circuit and, if the short-circuit is still present, moving the countersink electrode for a second time along a second and different path (R) away from the intermediate point ($R_K$).

2. The method according to claim 1, wherein the second movement of the countersink electrode comprises the step of moving the electrode out of the eroded workpiece opening in an upwardly sloping manner from the intermediate point ($P_R$).

3. The method according to claim 2, wherein the second path (R) is linear and is located in a withdrawal plane (RE) which is:
 (a) at right angles to a tangential plane (TE) at the intermediate point ($P_R$) and
 (b) is tilted with respect to a normal plane which is at right angles to the tangential plane (TE) and to a tangent on the erosion path (EB) at the intermediate point ($P_R$).

4. The method according to claim 3, wherein the second path (R) is inclined by a first angle (90°-$\alpha$) with respect to the tangential plane (TE) and by a second angle ($\beta$) with respect to the normal plane (NE).

5. The method according to claim 4, further comprising the step of choosing the second angle ($\beta$) in such a way that the second path (R) slopes opposite to the main erosion direction (HE).

6. The method according to claim 1, further comprising the step of varying the length ($|R|$) of the second path (R).

7. The method according to one of the claim 6 further comprising the step of varying the parameters ($\alpha, \beta, \delta, |R|$) of the withdrawal path from the first and second paths during the erosion process.

8. The method according to claim 1 further comprising the step of continuously determining the coordinates (X,Y,Z) of the first and second withdrawal paths during the erosion process.

9. The method according to claim 1, further comprising the step of determining the coordinates (X,Y,Z) of the first and second withdrawal paths after a short-circuit has occurred.

10. The method according to claim 1, further comprising the step of continuously determining the position of the withdrawal plane (RE) and consequently the two angles ($\alpha$ and $\beta$) during the erosion process.

11. The method according to claim 1, further comprising the step of determining the position of the withdrawal plane and the two angles ($\alpha$ and $\beta$) only when a short-circuit occurs.

* * * * *